Sept. 19, 1944.    F. D. ROSE    2,358,537
VEHICLE BODY
Filed June 2, 1942    2 Sheets-Sheet 2

Inventor
Frank D. Rose.

Attorney.

Patented Sept. 19, 1944

2,358,537

UNITED STATES PATENT OFFICE 2,358,537

VEHICLE BODY

Frank D. Rose, Pasadena, Calif., assignor to Paramount Acceptance Corporation, Hynes, Calif., a corporation of California Application June 2, 1942, Serial No. 445,431

9 Claims. (Cl. 280—5)

My invention has to do with cargo carriers and, in its more particular aspects, it involves improvements in freight transporting vehicles.

It is a well known fact that at present tank trucks such as are commonly used for transporting gasoline and other liquids have to return empty after delivering their load, which results in great inefficiency and expense. In my copending application Serial No. 316,968, filed February 2, 1940, now forfeited, I have shown a vehicle construction for adapting such trucks for two-way hauls, that is, after the liquid load is delivered, the truck may be converted into a cargo carrier for other types of freight. In some of its aspects, my present invention is a continuation in part of the subject matter of my said copending application.

It is among the principal objects of my invention to provide a tank vehicle comprising means for its utilization as a carrier of non-liquid freight whereby to render it possible to achieve a two-way pay load.

It is a further object to provide a vehicle of this character which involves novel and efficient means for firmly supporting the tank element when it is elevated to provide such a cargo space.

Another object is the provision, in a vehicle of this character, of utilizing means for controlling the elevating and lowering of the tank element with respect to the vehicle bed whereby to compensate for any inequalities in load distribution in the tank element.

Other objects and advantages which contribute to practicability and usefulness are inherent in my invention and how those as well as the foregoing specifically mentioned objects are achieved will be best understood from the following detailed description of one presently preferred embodiment of the invention, in which:

Fig. 4 is a fragmentary plan view taken on line 4—4 of Fig. 1.

Figure 1:
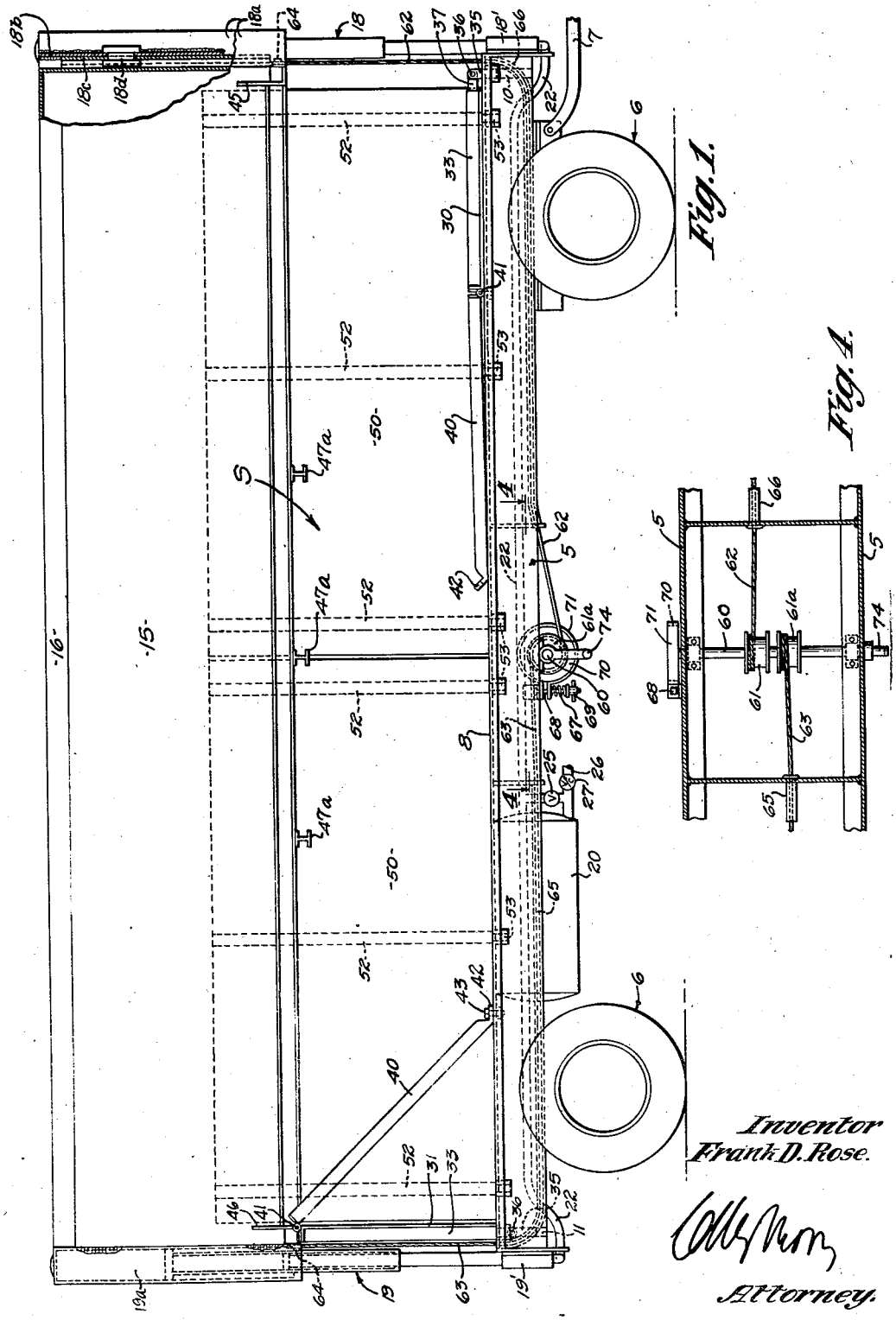
Fig. 1 is a side elevation showing the tank element elevated with respect to the vehicle bed, some parts being shown in elevation, one of the side plates being removed and one end gate being against the floor for illustrative purposes.

Referring now more particularly to the drawings, I show a trailer having a chassis or body 5 conventionally mounted on running gear 6 and having at its front end a coupling member 7 for connection to a pulling truck, not shown. It will be understood of course that my invention may be equally well incorporated in a self-propelled truck rather than in a trailer as shown. A floor 8 is mounted on the bed in the usual manner. Through the floor and in the bed, adjacent the ends, I provide sockets 10, 11, 10a, 11a for the purpose to be described.

I show at 15 a tank having the usual loading dome 16. The tank is mounted on telescopic jacks 18, 19 of well known construction secured at their bottom ends to the bed by brackets 18′, 19′ and secured at their top ends to the respective ends of the tank. Jacks 18 are secured to the tank by having their top end sections 18a secured to a transverse plate 18b, which plate is pivotally secured to a bracket 18c by pivot member 18d. Jacks 19 are secured to the rear end of the tank by having their top sections 19a welded or otherwise secured to the tank end. Thus the tank has a three-point mounting to prevent injury or distortion from torsional stresses. While hydraulically or otherwise operable jacks may be employed, I here show the jacks 18, 19 as being pneumatically operated from a compressed air tank 20 secured to the bed, through air lines 22 controlled by valve 25. For charging tank 20, I show a filling tube 26 controlled by a check valve 27 seating away from the tank.

At each end of the vehicle I mount an end gate 30, 31 carried by posts 32, 33, said gates being hingedly secured to the bed in the following manner. At the lower end of each of the posts 32, I provide a reduced projection 35 connected to the end of the post by hinge means 36 and at the end of each of the posts 33 I provide an integral reduced projection 37. Projections 35 fit into sockets 10, 11 and projections 37 fit into sockets 10a, 11a.

A brace 40 is hingedly connected at 41 to each end gate, there being one of these braces at each corner of the vehicle. Each brace is disposed longitudinally of the bed and at the lower end of each brace I provide a flange 42 which is detachably secured to the bed by a bolt 43 or in any other suitable manner.

Adjacent the respective ends of the tank, on its under side, I secure a support bracket 45, 46 which, when the tank is elevated (Figs. 1 and 2) rest upon the respective end gates being positioned thereon by pins 47, the head of each of which pins is secured, as by welding, to the top flange of an end gate and projecting upwardly through a hole in said flange as well as a registering hole provided in the adjacent support bracket. When the tank is in its elevated position, a cargo space S is provided between the bottom of the tank and the floor, and the end gates are upright, being longitudinally braced on the frame by the braces 40.

Figure 2:
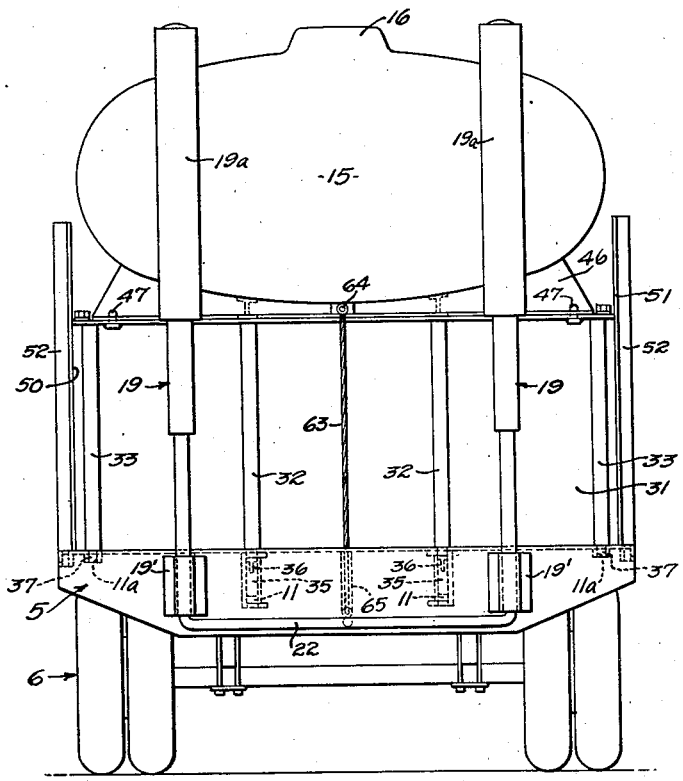
Fig. 2 is a rear (left) end view of Fig. 1.

To lower the end gates preparatory to lowering the tank, the tank is elevated somewhat above its normally supported elevated position sufficiently to permit brackets 45, 46 to be lifted from pins 47 and to permit the posts 32, 33 to be pulled upwardly from their sockets far enough to remove the hinge of each post 32 from its socket and each projection 37 from its socket, after which the posts are placed flatly against the floor as shown in the right hand end of Fig. 1. When the tank is in its lowered position (Fig. 3) its brackets 45, 46 rest against the outer face of the end gates resting on the floor, medial transverse brackets 47a being secured to the bottom of the tank to provide support for the medial portion of the tank.

Side plates 50, 51 are shown as being secured to the bed by posts 52, which are made detachable by providing projections 53 at the bottom ends of the posts and detachably fitting those projections in corresponding sockets in the bed. When in its lowered position, the tank rests between the side plates 50, 51 unless it be desired to remove the side plates. Plates 50, 51 are shown as being in two sections.

Figure 3:
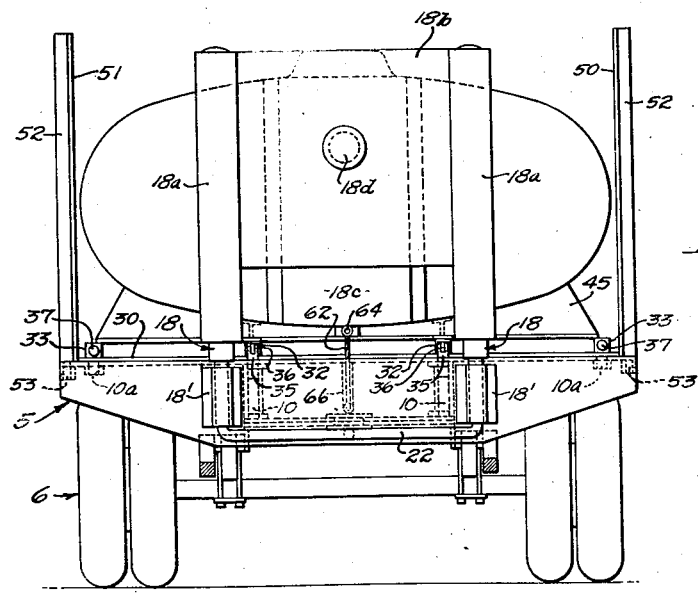
Fig. 3 is a front (right) end view showing the tank in lowered position.

In operating the pneumatic jacks to lift the tank from the position of Fig. 3 to the position of Fig. 1, it frequently occurs that the weight distribution is unequal as between the ends of the tank, which causes one end of the tank to tend to rise faster than the opposite end which, if not controlled, would cause jamming. I overcome this difficulty by the equalizing means now to be described.

Transversely of the bed 5, I journal a shaft 60 which carries a pair of drums 61, 61a around which respective cables 62, 63 are windable in opposite directions, the other ends of the respective cables being secured to the respective ends of the tank at 64 after passing through tubes 65, 66, so that as the tank is elevated the cables rotate shaft 60 and unwind from the respective drums in opposite directions. I secure to shaft 60 a brake drum 70 around which I mount a brake band 71, the ends of the band being resiliently drawn together to brake the drum by means of spring 67 mounted on pin 68, which pin extends through registering holes in the flanged ends of the band and carries a threaded adjusting nut 69 at one end for adjusting the tension of the spring. For rewinding the cables about the drums as the tank is being lowered, I provide a crank 74 secured to an end of the shaft. Braking pressure applied to the shaft 60 equalizes the rate of unwinding of the cables from the shaft.

In operation, for instance for the going trip, the tank 15 is lowered to the position of Fig. 3, in which it rests against the end gates, the end gates being then placed flatly against the floor. In this position the vehicle is primarily a tank car or truck. After the liquid cargo has been discharged at its destination, the tank may be elevated to a point slightly above the position of Figs. 1 and 2 and the end gates placed upright, their end projections being inserted in the corresponding sockets in the bed and the braces 40 secured to the body, after which the tank is lowered against the end gates (the positions of Figs. 1 and 3), where the brackets 45, 46 rest against the top edge of the end gates. In this position the space S may be utilized for another cargo to be hauled on the return trip, the end gates 31 and side plates 51, 52 forming closures for the cargo space and the tank providing a cover therefor.

By the structure defined, it will be seen that when the tank is in elevated position it is rigidly supported vertically and against side sway by the end gates 6, thus making it possible to relieve the pneumatic pressure on the jacks, and the tank is also securely braced by means of braces 40 to prevent any sway in a direction longitudinally of the bed.

While I have resorted to considerable detail in describing these particular adaptations, I have done so only to make my invention clearly understandable. Other modifications and adaptations may be made within the broader scope of my invention as defined by the following claims.

I claim:

1. In a vehicle of the class described, the combination of a bed, a tank movably mounted on the bed, hoist means operatively engaging the tank to move it from a lowered position on the bed to an upper position spaced thereabove whereby to provide a cargo space therebetween, and support means, independent of the hoist, supportingly engaging the tank to maintain it in position spaced above the bed, said support means comprising end gates defining the ends of the cargo space.

2. In a vehicle of the class described, the combination of a bed, a tank movably mounted on the bed, hoist means operatively engaging the tank to move it from a lowered position on the bed to an upper position spaced thereabove whereby to provide a cargo space therebetween, and support means, independent of the hoist, supportingly engaging the tank to maintain it in position spaced above the bed, said support means comprising end gates defining the ends of the cargo space and being hingedly connected to the bed whereby to be swung into position underlying the tank when the tank is in lowered position.

3. In a vehicle of the class described, the combination of a bed, a tank movably mounted on the bed, hoist means operatively engaging the tank at spaced points therealong to move it from a lowered position to a position spaced above the bed, and equalizing means so operatively connected to the tank at spaced points therealong as to prevent one portion of the tank from moving at a speed different from the speed of movement of another portion of the tank, said last-mentioned means including a shaft, a pair of cables windable about the shaft in opposite directions and respectively connected to the tank at points spaced therealong and braking means engaging the shaft sufficiently to compensate for inequalities in the pull exerted on the respective cables by virtue of movement of the tank by the hoist means.

4. In a vehicle of the class described, the combination of a bed, a tank having a rounded bottom, said tank being mounted for movement perpendicular to the bed, end brackets on the bottom of the tank presenting straight bottom surfaces, jack members connected at one end to the bed and at the other end to the respective ends of the tank whereby to move the tank into position spaced above the bed and provide a cargo space therebetween, and closure members defining the ends of said cargo space, said closure members having top portions engaging the respective end brackets on the tank whereby to provide support for the tank when the latter is in position spaced above the bed.

5. In a vehicle of the class described, the combination of a bed, a tank having a rounded bottom, said tank being mounted for movement perpendicular to the bed, end brackets on the bottom of the tank presenting straight bottom surfaces, jack members connected at one end to the bed and at the other end to the respective ends of the tank whereby to move the tank into position spaced above the bed and provide a cargo space therebetween, closure members defining the ends of said cargo space, said closure members having top portions engaging the respective end brackets on the tank whereby to provide support for the tank when the latter is in position spaced above the bed, and brace members extending from the upper portions of the closure members to the bed in a direction longitudinal of the bed.

6. In a vehicle of the class described, the combination of a bed, a tank movably mounted on the bed, hoist means operatively engaging the tank to move it from a lowered position on the bed to an upper position spaced thereabove whereby to provide a cargo space therebetween, and side and end closure members carried by the bed and forming a closure for the sides and ends of the cargo space, said end closure members providing direct support for the tank when in its upper position and said side closure providing a housing for the tank when in lowered position.

7. In a vehicle of the class described, the combination of a bed, a tank movably mounted on the bed, hoist means operatively engaging the tank to move it from a lowered position on the bed to an upper position spaced thereabove whereby to provide a cargo space therebetween, and end gates carried by the bed and bearing at their top edges against the end portions of the tank whereby to provide the sole support for the tank when in its upper position.

8. In a vehicle of the class described, the combination of a bed, a tank, and hoist means for raising and lowering the tank with respect to the bed, said hoist means being pivotally secured to one end portion of the tank and rigidly secured to the other end portion.

9. In a vehicle, the combination of a bed, a tank mounted for movement perpendicular to the bed, means for so moving the tank comprising a hoist operatively engaging the tank, and means independent of the hoist for supporting the tank in position above the bed, comprising a support member swingably mounted on the bed for movement from a horizontal position to a tank-supporting position perpendicular to the bed.

FRANK D. ROSE.